Figure 1:
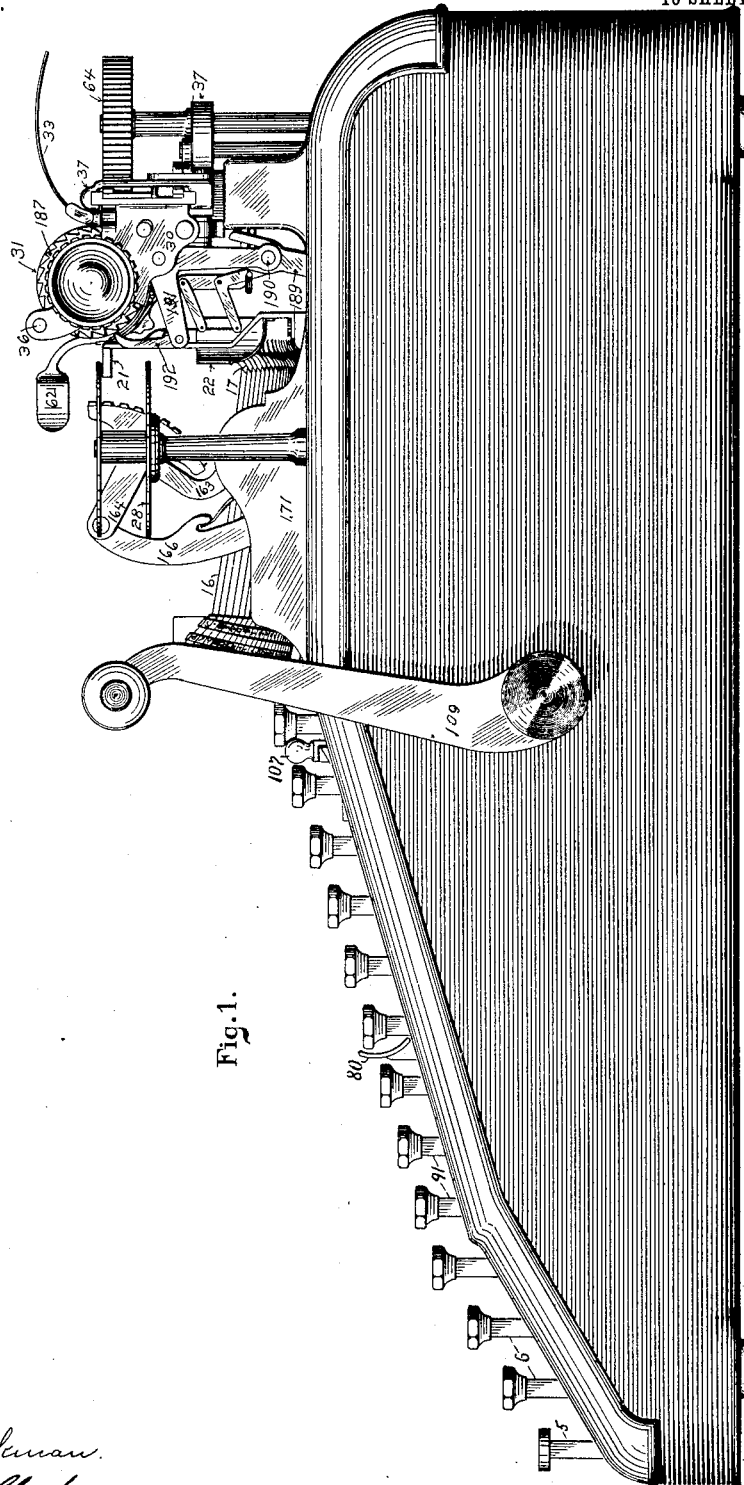

No. 744,004. PATENTED NOV. 10, 1903.
H. ELLIS.
ARITHMOGRAPH.
APPLICATION FILED FEB. 18, 1902.
NO MODEL. 10 SHEETS—SHEET 3.

Attest:
L. E. Rickman
Edwin S. Clarkson

Inventor
Malcolm Ellis.

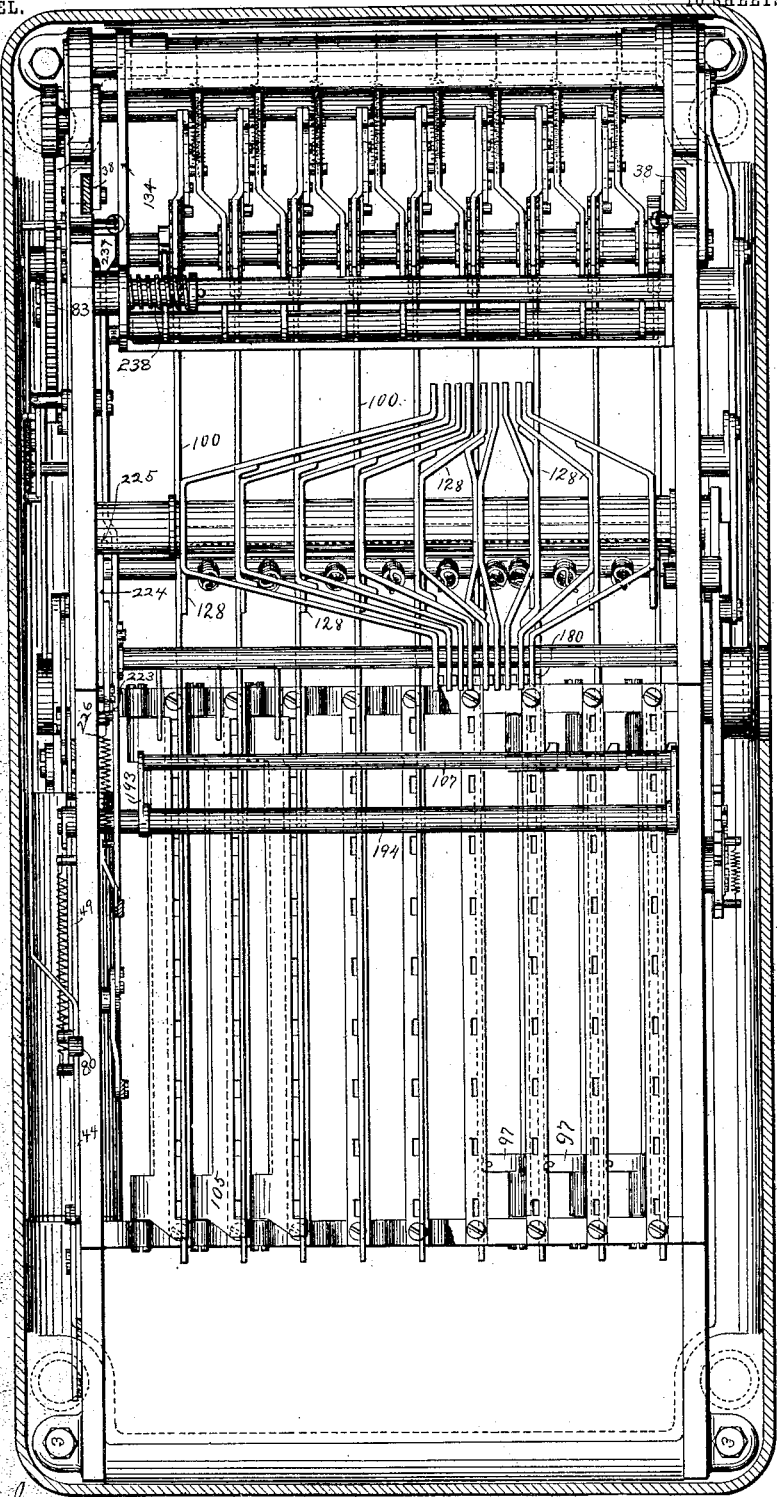

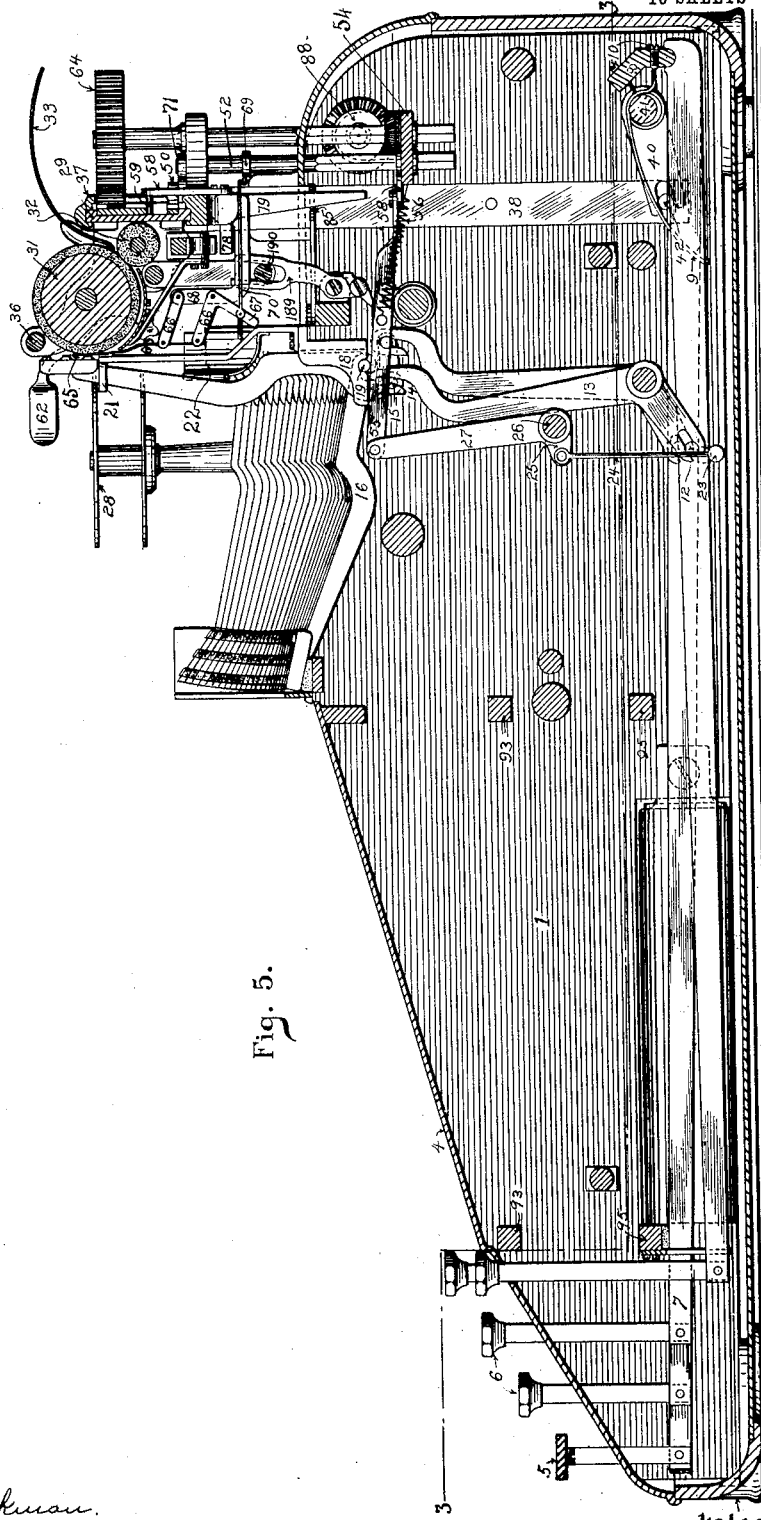

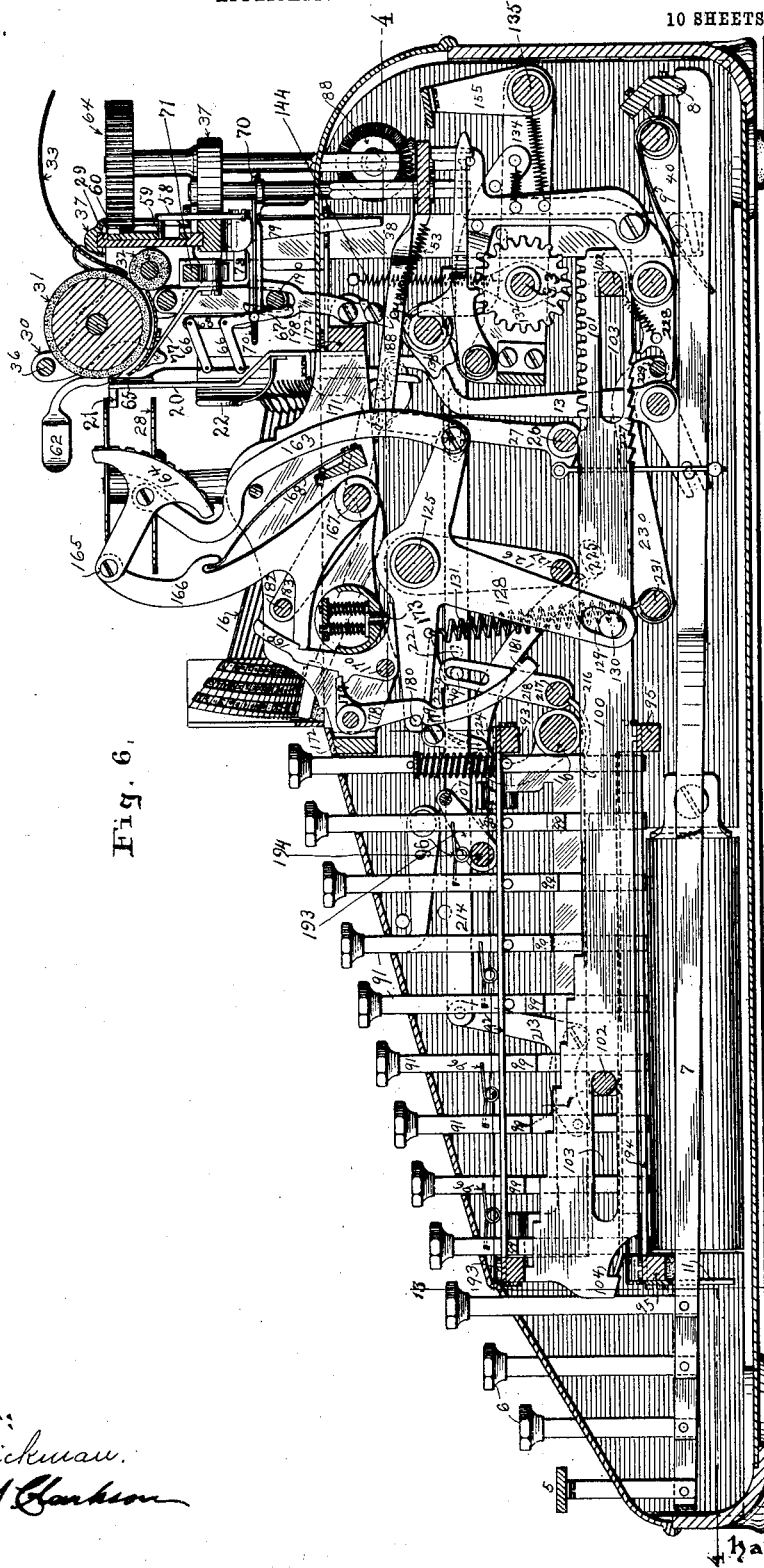

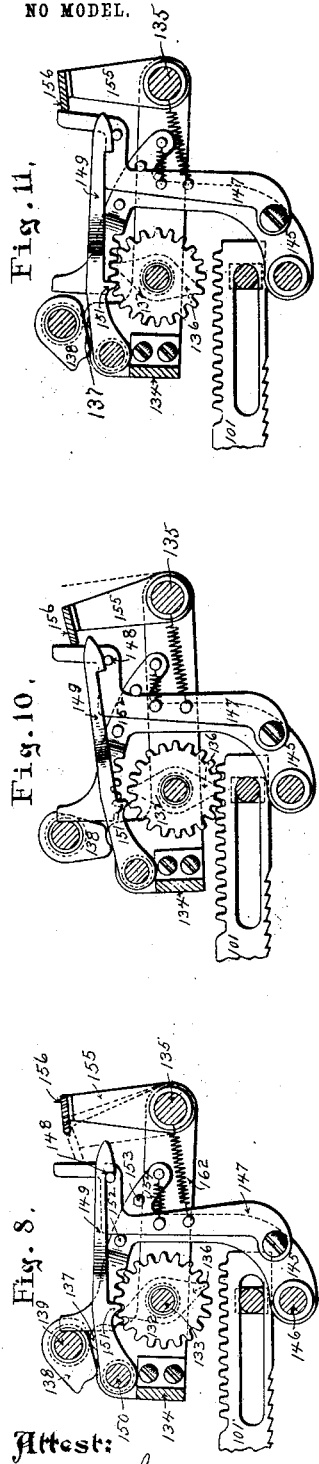

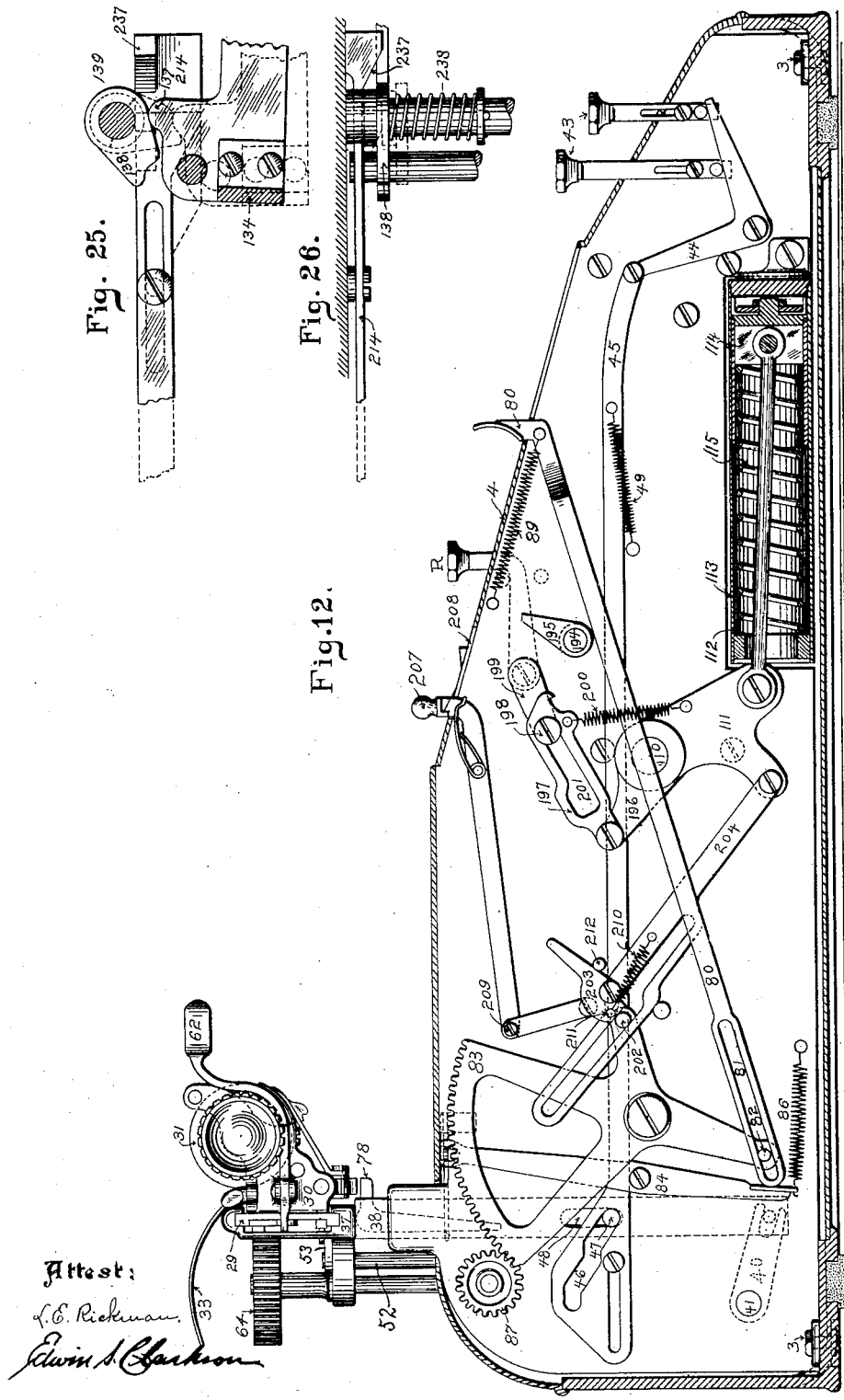

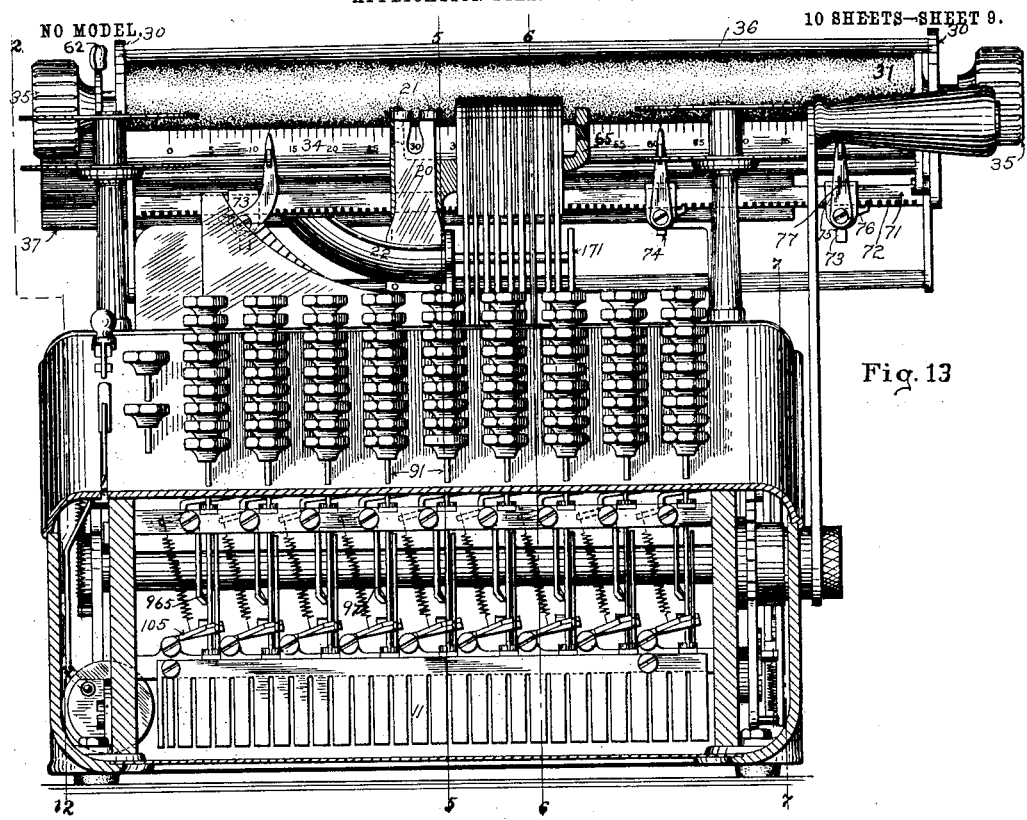

No. 744,004. PATENTED NOV. 10, 1903.
H. ELLIS.
ARITHMOGRAPH.
APPLICATION FILED FEB. 18, 1902.
NO MODEL. 10 SHEETS—SHEET 10.
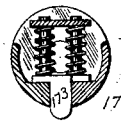
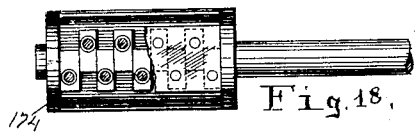
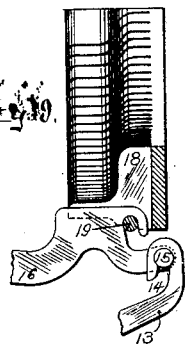
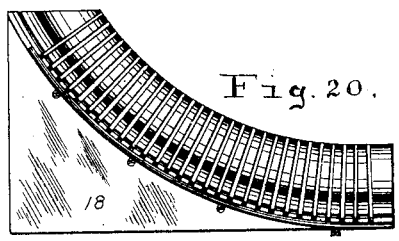
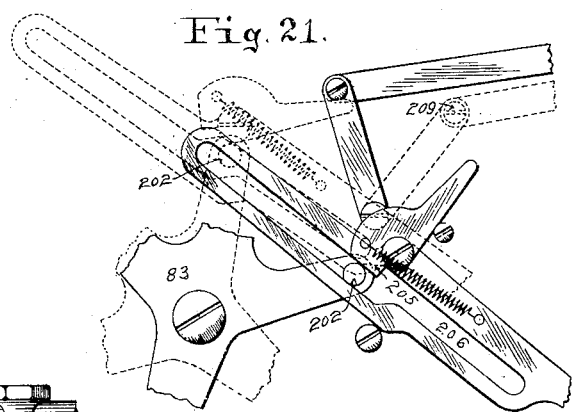
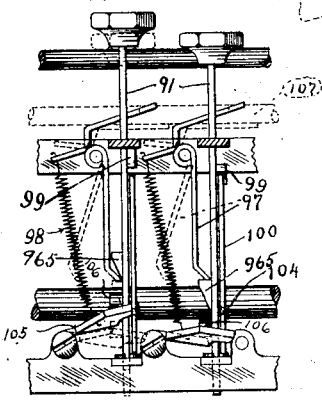
Attest:
L. E. Rickman
Edwin S Clarkson
Inventor:
Malcolm Ellis No. 744,004.

Patented November 10, 1903.

UNITED STATES PATENT OFFICE.

HALCOLM ELLIS, OF ST. LOUIS, MISSOURI, ASSIGNOR TO AMERICAN ARITHMOGRAPH COMPANY, OF NEW YORK, N. Y., A CORPORATION OF MAINE.

ARITHMOGRAPH.

SPECIFICATION forming part of Letters Patent No. 744,004, dated November 10, 1903.

Application filed February 18, 1902. Serial No. 94,688. (No model.)

*To all whom it may concern:*

Be it known that I, HALCOLM ELLIS, a citizen of the United States, residing in the city of St. Louis and State of Missouri, have invented a certain new and useful Improvement in Arithmographs, of which the following is a specification, which, together with the accompanying drawings, fully describes and illustrates the nature, functions, and operations of the invention.

The invention is embodied in a machine about the size of an ordinary type-writing machine and of much the same general appearance; and it is intended to perform all the functions of a type-writing machine and of an arithmometer or recording-calculator and perform these functions not only separately but conjointly.

The machine consists, essentially, of a body upon the inclined top of which are arranged twelve rows of keys. Beginning at the front edge the first three rows of keys have letters and certain figures and signs upon them, the last nine rows of keys have figures only, the four throw of keys having the figure "1" on, the fifth row has the figure "2" on, and so on to the twelfth row, which has the figure "9." Back of the last row of keys and somewhat elevated above the top is a roller mounted in a sliding carriage, about which the paper to be printed on passes and is fed both longitudinally and vertically. Between the roller and the last row of keys is the printing mechanism, consisting of type letters and figures variously operated and an inking-ribbon on which the type strike on the front of the roller and are then retracted from it, and the inking-ribbon is elevated to the printing-line at the time the type strike, being afterward depressed to leave the type-written line in clear and unobstructed view. Just in front of the first row of keys is the spacing-bar, and on the right-hand side of the machine is the operating-handle.

In operation paper is inserted about the roller, the carriage is pushed to the right, and the words to be written are depressed on the first three rows of keys, the depression of each key causing the character thereon to be printed and the carriage to move one space to the left, as in case of a regular type-writing machine. When it is desired to print the figures of a list or column of figures whose total is to be taken, the keys in the last nine rows are depressed, each column of keys representing one denomination, and the handle is drawn forward, which causes the figures so depressed to be printed and at the same time added upon the accumulating device within the machine. When the total is wanted, a key on the left-hand side of the machine (marked T) is depressed, the handle drawn forward, and the total will be printed. Each time the handle is drawn forward the paper is fed vertically one space; but the depression of the keys in the upper nine rows does not cause the carriage to move laterally. In this way any required form of bill, invoice, statement, or account where both written words and figures to be added are used may be written with this machine and the arithmetical part of the work be mechanically performed.

Many conveniences for the saving of time and perfecting the work of the machine are embodied in the invention and will be described in detail and their functions and operations pointed out in the description of the drawings.

Figure 2:
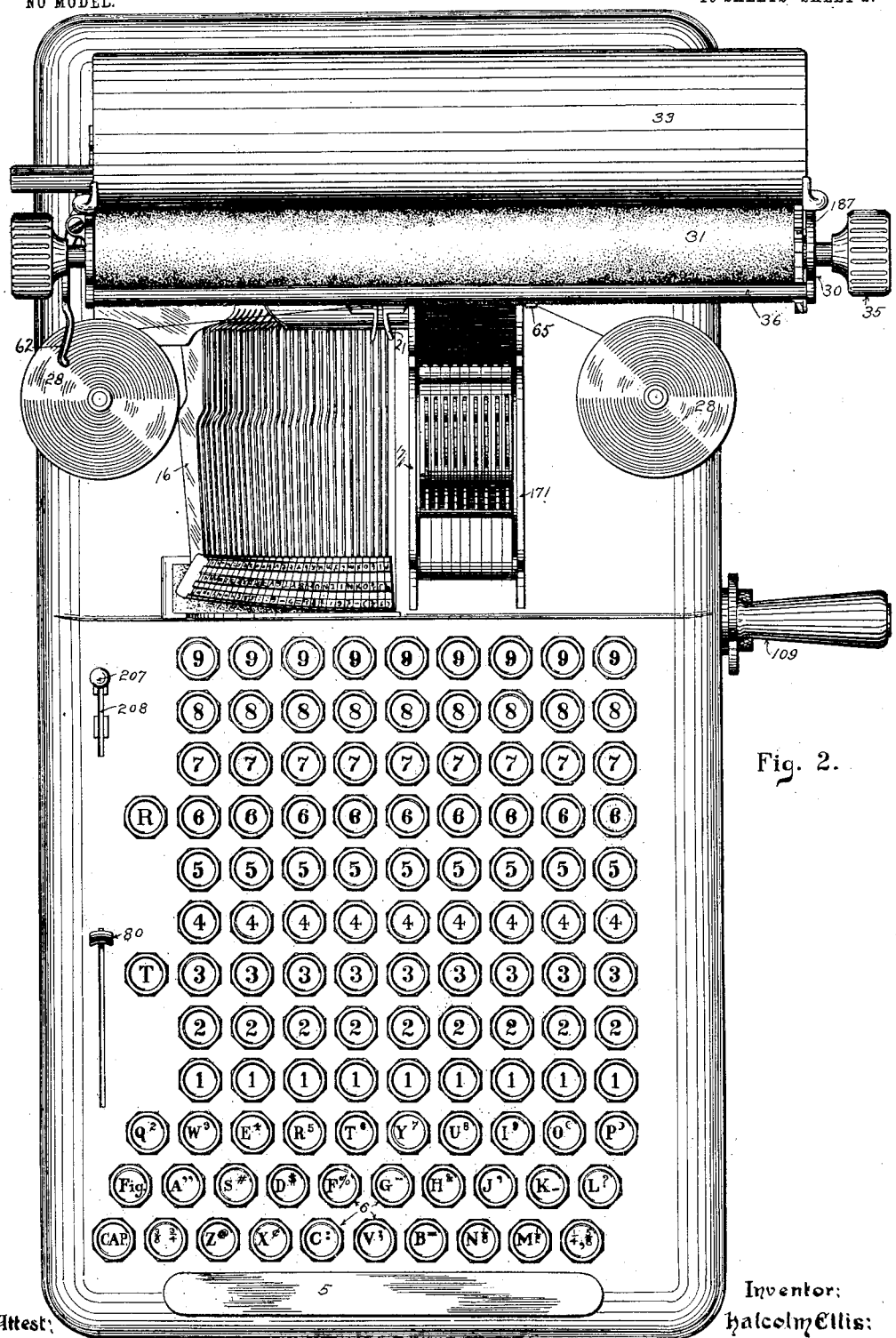
Figure 3:
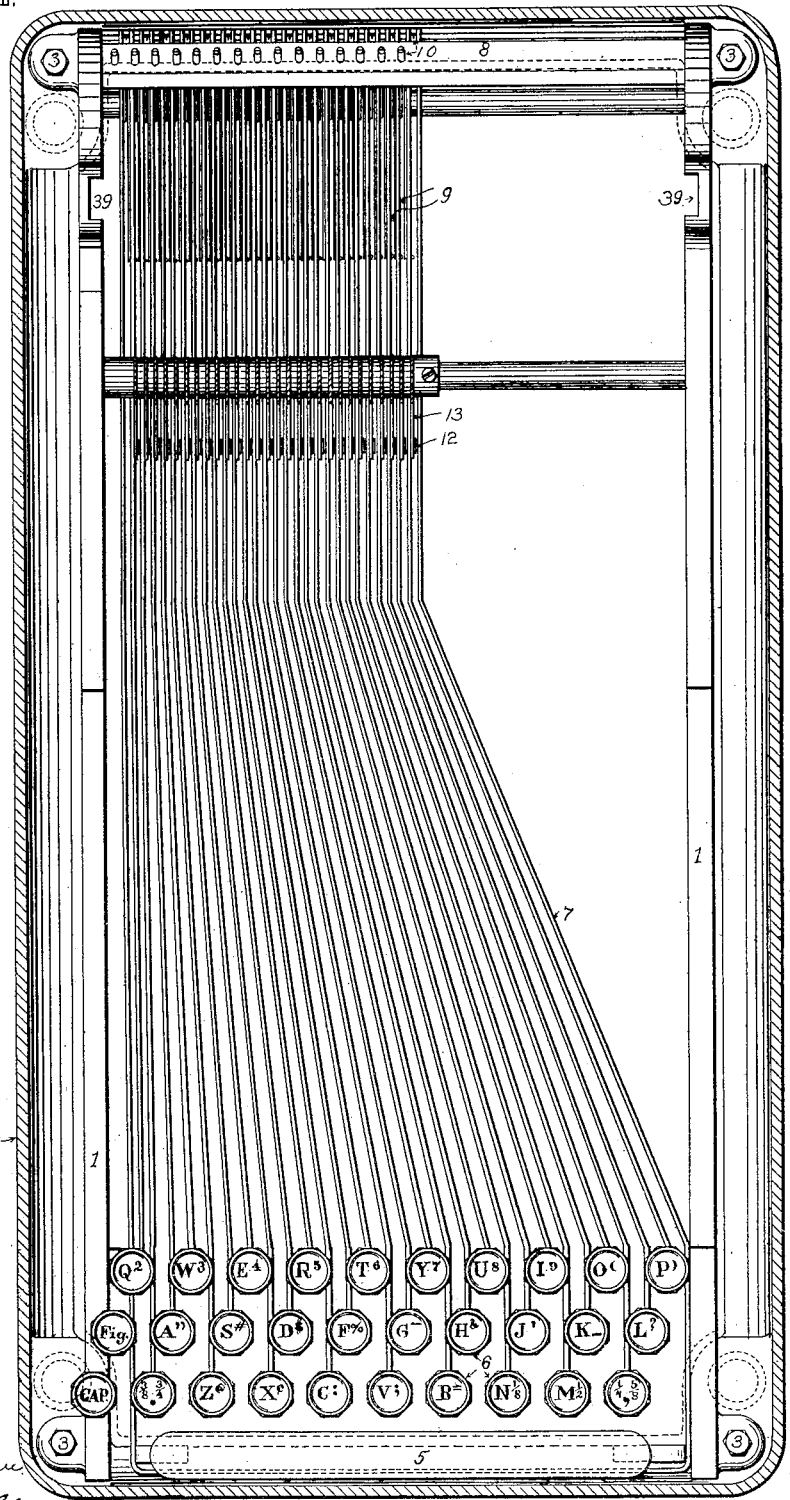

Referring to the drawings, Figure 1 is an elevation showing the right-hand side of the machine. Fig. 2 is a plan or top view of the machine. Fig. 3 is a horizontal section on line 3 3 of Fig. 5. Fig. 4 is a horizontal section on line 4 4 of Fig. 6. Fig. 5 is a vertical section on line 5 5 of Fig. 13, showing only parts operated by the first three rows of keys, other parts for the sake of clearness being omitted. Fig. 6 is a vertical section on line 6 6 of Fig. 13, showing particularly the parts operated by the last nine rows of keys. Fig. 7 is a vertical section on line 7 7 of Fig. 13, showing only the operating parts on the outside of right frame. Fig. 8 is a detail of the carrying device, showing position of parts at the time when the handle is at its normal position. Fig. 9 is a detail of the carrying device, showing position of parts at the time when the handle is at its extreme forward position. Fig. 10 is a detail of the carrying device, showing position of parts during the return stroke of the handle, the accumulator-wheel having revolved a distance of ten teeth. Fig. 11 is a detail of the carrying device, showing position of parts at the time when the handle has returned to its normal position and a carrying has been performed. Fig. 12 is a vertical section on line 12.12 of Fig. 13, showing the operative parts on outside of the left-hand frame. Fig. 13 is a vertical cross-section on line 13 13 of Fig. 6, showing a front view of the carriage. Fig. 14 is a detail rear elevation of the carriage. Fig. 15 is a detail plan on line 15 15 of Fig. 14. Fig. 16 is a detail plan on line 16 16 of Fig. 14. Fig. 17 is a section detail of releasing-plungers for the calculating type-sectors. Fig. 18 is a plan of Fig. 17. Fig. 19 is a detail sectional view of the segmental journal-block for the type-writing arms, showing the type-bar and its operating-lever in position. Fig. 20 is a front elevation of the segmental journal-block shown in Fig. 19. Fig. 21 is a detail showing the handle connection to the carriage-operating device. Fig. 22 is a detail front view of two key-stems of the calculator, showing them in two positions and the connecting parts in various positions. Fig. 23 is a side view of the calculator printing-lock. Fig. 24 is a front view of Fig. 23, showing the overlapping fingers. Fig. 25 is a detail side view of the total-key-operating device. Fig. 26 is a plan of Fig. 25.

It will be seen from the drawings that all of the mechanism of this machine is supported upon and between the two vertical plates 1, which extend lengthwise of the machine. These plates 1 are held in their lateral position by various cross-bars and are surrounded and supported by the frame 2, to which they are secured by suitable screws 3. A cover 4, through which the key-stems and printing mechanism pass, extends over the upper part of the plates 1 and protects the working parts within. These parts may be divided into groups for performing the principal functions of the machine and will be so described.

*The type-writing mechanism.*—Near the front edge of the machine is a space-bar 5 of the usual pattern, back of which extend three rows of keys 6, arranged in the order of an ordinary type-writing machine. (See Figs. 2, 3, 22, and 5.) Each key 6 is connected to a lever 7, which is fulcrumed at its rear end under a bar 8 and is held up by a spring 9, whose tension is adjustable by a screw 10. A guide-plate 11 (see Fig. 13) maintains the lateral position of the front ends of the bars 7. A pin 12 on the lever 7 operates the short end of a bent crank 13, the long arm of which connects by a slot 14 to a pin 15 in the type-arm 16. These type-arms 16 are of thin sheet metal and swing in radial slots 17 in a segmental block 18, a bent wire 19 forming the pivot. The end of the arm 16 has three type engraved thereon and is bent so that the type are in vertical alinement when in contact with the roller. A vertical post 20, having two spreading jaws 21, forms a guide for the type at the point of printing, and a curved shield 22 serves to keep the falling lint from the inking-ribbon and other dirt from clogging the slots 17 in the segmental block 18. A universal bar 23 extends under the lever 7 and is depressed by the action of the keys 6 or spacing-bar 5. The universal bar 23 is suspended at each end by a wire 24 from the end of a small crank 25, mounted on a shaft 26. A crank 27, mounted on the same shaft 26, operates the lateral travel of the carriage. The inking-ribbon is wound about the spools 28, which are mounted upon the top of the machine and are caused to rotate by any suitable means. The same forming no part of this invention, none are shown. The action of all of the twenty-eight type-arms 16 being the same, the description of one answers for all.

*The carriage.*—This consists, first, of the sliding plate 29, on which are mounted the brackets 30, (see Fig. 12,) which support the roller 31, and the friction-roller 32, the paper-guide 33, and the scale 34. To insert paper in the machine, it is first passed over the guide 33, and the roller 31 is turned by the usual knob 35, which causes the paper to pass between the roller 31 and the friction-roller 32. The scale 34 guides the paper around the roller 31 to a vertical position, and it is then guided under the rod 36. The plate 29 slides freely in the guide-frame 37, which is mounted upon vertically-sliding bars 38, which move in grooves 39 in the plates 1. (See Figs. 3 and 16.) The object of the vertical movement of the carriage is to bring the printing-line on the roller 31 before each of the three type engraved on the end of the type-bar 16. Slotted cranks 40, secured to shaft 41, (see Fig. 5,) embrace pins 39 on the bars 38 and cause them to move simultaneously. The raising and lowering of the carriage is done with the shift-keys 43, (see Fig. 12,) which depress one end of a bell-crank 44, the other end of which is connected to a bar 45, which has a cam-slot 46 through it. A pin 47, secured in the bar 38, extends through the vertical slot 48 in the plate 1 and the cam-slot 46. When the shift-key 43 (marked "Cap." in Fig. 3) is depressed its full distance, the cam-slot 46 has elevated the pin 47 and the carriage, so that the center of the roller 31 or printing-line is opposite the face of the middle type of the type-bar 16. When the upper shift-key 43 (marked "Fig." in Fig. 3) is depressed, bar 45 is drawn forward until the cam-slot 46 raises the pin 47 until the printing-line on the roller 31 is opposite the upper type on the type-bar 16. A spring 49 returns the bar 45 to its normal position. The lateral feed of the carriage is accomplished through the oscillation of a small hook 50, which swings at the end of a small crank 51, (see Fig. 15,) secured to the upper end of a vertical shaft 52. The lower end of shaft 52 is squared and passes through the sleeve of a crank 53, (see Figs. 16, 5, 6, and 14,) which is mounted in the cross-bar 54. The connecting-rod 55 extends from the crank 53 to the arm 27. It will thus be seen that when any key-lever 7 is depressed and the universal bar 23 lowered the arm 27 will be swung forward, and through connecting-rod 55 the shaft 52 will oscillate, and with it the hook 50. A spring 56 (see Figs. 5 and 16) returns the parts to their normal position and serves to keep the universal bar 23 in its raised position. The hook 50 engages a ratchet 57 on the back of plate 29, and every time a key-lever 7 is depressed the hook 50 is brought into engagement with the next tooth to the right on the ratchet 57, and when the key-lever 7 rises the spring 56 returns the hook 50 to its normal position and moves the carriage one space to the left. To prevent the hook 50 from engaging other than the next tooth in the ratchet 57, a bent lever 58 is interposed between the point of the hook 50 and ratchet 57. It is also evident that if the bent lever 58 be moved to the right in Figs. 14 and 15 the hook 50 will be raised out of engagement with the ratchet 57, which is necessary whenever the carriage is returned to the right-hand side of the machine in order to commence a new line of writing. The upper end of the bent lever 58 has a pin 59 extending under the rack-bar 60. This rack-bar 60 is mounted on the rear side of plate 29. Screws passing through diagonal slots 61 (see Fig. 14) in the rack-bar 60 cause the same to rise and fall as it is moved laterally in relation to the plate 29, and a movement to the right in Fig. 14 will cause bar 60 to depress pin 59, and bent lever 58 will move to the right and raise hook 50 out of engagement with the ratchet-bar 57 and permit the carriage to be moved uninterruptedly to the right. Two means for sliding rack-bar 60 to its lowered position are provided—one is a handle 62, (see Fig. 12,) which engages a hook 63 at the end of the rack-bar 60. When this handle is pushed to the right, the rack-bar 60 is first depressed and disengages the hook 50, after which it moves the carriage to the right. The other means provided is a spur-gear 64. If the gear 64 be rotated to move the carriage to the right, it will first depress the rack-bar 60 and indirectly release the hook 50 from the ratchet 57. The inking-ribbon is passed through a guide 65, which raises the ribbon each time the type strikes the printing-line, so as to interpose it between the type and the paper, the guide 65 being suspended by the parallel arms 66, one of which has an extension 67 for connection with the operating device. The arms 66 are mounted on the upright 68, which at its lower end is bent rearward and secured to the guide-way 37. A small crank 69 on the shaft 52 serves to raise the guide 65 every time the shaft 52 is turned by means of a connecting-rod 70, the two positions of the parts being shown in Figs. 6 and 5. A square rod 71 extends between the brackets 30 and has teeth 72 cut on its bottom side that correspond in pitch with the scale 34 and ratchet 57. On this rod 71 are mounted the marginal stops 73 and the tabulating-stops 74. The construction of both and their operation are substantially the same and consist of a box 75, the sides of which extend down below the bottom of the rod 71 and form journals for an angle-piece 76, one end of which extends to the side and engages the teeth 72, while the other end extends straight down. A pointer 77 is secured to the outer end of the pivot of 76 and serves to turn the lateral point of 76 out of engagement with the teeth 72 when it is desired to move the stop and secures the stop in position when turned upright by spring friction against the scale 34. A bumper 78 is pivoted on the under side of the guide-frame 37 and has an arm 79, extending downward. The lower point of the angle-piece 76 in the tabulating-stops 74, is shorter than the corresponding parts in the marginal stops 73 and pass over the top of the bumper 78 when in its normal position; but when arm 79 is moved forward the bumper 78 is raised, so that the angle-piece 76 of the tabulating-stop 73 will engage the same and limit the travel of the carriage. The angle-piece 76 of the marginal stops is made long enough to engage the bumper 78 while in its normal position.

Tabulated work on the machine is done in the following manner: The tabulating-stops 74, and there may be as many of these as desired, are set at the proper places on the scale 34, and the first writing is done. The tabulating-lever 80 (see Fig. 12) is then drawn forward, and the carriage at once moves to the left until the first tabulating-stop 74 comes to the printing-point. This is accomplished in the following manner: The lever 80 has at its rear end a slot 81, which surrounds a pin 82 at the lower end of a pivoted rack 83 and projects a little farther and abuts against the lower end of a lever 84, the upper end of which engages the end of a lever 85, (see Figs. 14, 15, and 16,) the other arm of which engages the arm 79 of the bumper 78. When the lever 80 is drawn forward, the spring 86 causes the levers 84 and 85 to swing the arm 79 forward and raise the bumper 78 into the path of the tabulating-stop 74, and the end of the slot 81 engaging the pin 82 swings the same forward and causes the rack 83 to rotate the pinion 87, whose motion is transferred through miter-gears 88 to the pinion 64, which acts on the rack 60 and propels the carriage to the left until the tabulating-stop 74 meets the bumper 78. On releasing the lever 80 the spring 89 returns it to its normal position, the slot 81 sliding over the pin 82 without changing the position of the carriage and moves the lower end of lever 84 to its normal position, which causes the bumper 78 to descend out of the path of the tabulating-stop 74. This process may be repeated as many times as there are columns to be tabulated. A small bell 89 (see Fig. 14) is arranged to be rung by the right-hand marginal stop 73, a few spaces before the stop reaches bumper 78 a pin (not shown) extending from the back of the stop raising the striker 90 as it passes.

The above-described mechanism comprises all the parts required to execute ordinary type-writing, including tabulated forms. Where it is desired to include lists of figures to be added it is necessary to use the calculator-keys. These consist of nine rows of keys numbered from "1" to "9" consecutively, the keys numbered "1" being on the fourth row from the front. The keys from the fourth to the ninth rows are arranged in straight lines or columns from front to back of the keyboard and not staggered, as in case of the lettered keys 6, each column of numbered keys representing the units of one denomination. (See Fig. 2.) Each column of numbered keys has an individual set of working parts throughout the machine, and as the parts are practically duplicates in all the columns but one will be described. Referring to Fig. 6, it will be seen that the key-stems 91 pass through an upper guide-bar 92, which is supported by cross-pieces 93, and a lower guide-bar 94, supported by cross-pieces 95. A suitable spring 96 tends to keep the key in its upper position. On the left side of each stem 91 is a wedge-shaped lug 296 with the flat side up, and suspended between the cross-pieces 93 is a latch-plate 97, which is held in contact with the key-stem 91 by the spring 98. When a key is depressed, this latch-plate 97 is swung to the left until the lug 296 has passed its lower edge, when it swings back and holds the key-stem 91 in its lowered position, at the same time releasing any key previously depressed. On the right side of each of the first eight key-stems there is a stop 99, and a rack-bar 100 has a series of steps for engaging said stops 99 when the same are depressed. These steps are so arranged that they increase the distance from the step to its corresponding stop 99 by an amount equal to the pitch of the rack 101 successively, beginning with a pitch distance from the first step to the first stop 99, twice the pitch distance from the second step to the second stop 99, and so on. The rack-bars 100 are properly supported on cross-rods 102, that pass through slots 103 therein, and these slots 103 are of a length to permit a movement equal to nine times the pitch of the rack 101. The forward end of the rack-bar 100 has a hook 104 near its lower edge, and a catch-plate 105 (see Figs. 13, 22) is held in engagement therewith by the spring 98, the plate 105 being pivoted between the cross-pieces 95. A rivet 106 on the left side of key-stem 91 rests on the upper edge of the plate 105, and when the key-stem 91 is depressed the catch-plate 105 is disengaged from the hook 104 on the rack-bar 100. The rack-bar 100 may now be moved toward the rear of the machine until one of the steps thereon strikes the stop 99 on the depressed key-stem 91. The device for moving the rack-bar 100 back and forth and the functions of the said rack-bar 100 will be later explained. When the proper time for releasing the key-stems 91 has arrived, a horizontal rod 107 is lowered against the projection 108 on the latch-plate 97 and swings the lower edge of the same out from engagement with the lug 296 (see Fig. 22) on the key-stem 91 and permits the depressed key-stem 91 to resume its normal position.

*The handle.*—The handle 109 is at the right-hand side, and in its normal position is vertical. It moves through an angle of about sixty degrees forward and is detachably connected to the main shaft 110. The handle 109 serves as a motor for all the operating parts of the machine after the calculator-keys are depressed, causing the machine to add the amounts depressed on the keys, print the same on the paper in the carriage, feed the paper around the roller, move the carriage transversely to the position for writing a new line when desired, and restore all parts of the calculator device to position ready for a new operation. It is drawn forward by hand and released and returns by means of suitable spring tension. A crank 111 being connected to the left end of the main shaft 110 (see Fig. 12) has a connecting-rod 112 extending into a cylinder 113. The piston 114 compresses the coil-spring 115 on its forward stroke, and the air-cushion formed behind it causes it to return without jar. At the right-hand end of the main shaft 110 (see Fig. 7) near the side 1 is secured an irregular-shaped disk 116, on which are formed various cams, crank-pins, strikers, &c., for successively performing the timed functions of the calculators. These details will be described each in connection with the part it operates.

The forward edge of the disk 116 (see Fig. 7) has a rack 117 cut in it, and a double pawl 118 engages the same and is held in contact by the spring 119, connected to the head of the pawl 118, and the stud 120, secured to the plate 1.

A tongue 121, secured to the pawl 118, is engaged by the pins 322 on the disk 116 at each end of the stroke of the handle 109 and serves to reverse the pawl 118. As the pawl 118 is only reversed by the pins 322, the handle 109 must complete its stroke in each direction before being reversed. These are the only parts which exclusively concern the handle 109. Cut through the disk 116 on its rear side from the main shaft 110 is a cam-slot 122, which is arranged to be on an arc of a circle with its center in the center of the main shaft 110 for a short distance. The cam-slot 122 then moves away from the center of the main shaft 110 for a considerable distance, after which it again travels in a path of a circle having the same center as the main shaft 110. A crank-pin 123 slides in the slot 122 and is connected to the crank 124, which operates the shaft 125. Secured to the shaft 125 within the frames 1 are two crank-arms 126, which carry a rod 127 between their lower ends. The shaft 125 also serves as an axis for the three-pointed piece 128, the lower point of which has a radial slot 129, through which a pin 130 extends and which is secured to the rack-bar 100. The forward arm of the piece 128 has a coiled spring 131 secured thereto, the other end of which is secured in the lower part of the machine. Its tendency is to draw the forward end of the piece 128 downward, and this same tendency would cause the rack-bar 100 to move in a rearward direction were piece 128 not restrained by the rod 127 engaging said piece. When the handle 109 is pulled forward, the cam-slot 122 causes the crank 124 to rotate the shaft 125 and swing the rod 127 to the rear. This permits the springs 131 to move the rack-bar 100 as far to the rear as the distance between the stop 99 on the depressed key-stem 91 and the corresponding step on the rack-bar 100. When the handle 109 is released, it returns to its normal position, and the cam-slot 122, acting as before described, swings the rod 127 back to its normal position, which in turn causes the restoring of the rack-bars 100 and incidentally the release of the key-stem 91 by means which will be subsequently described.

*The adding mechanism.*—The theory of the calculator device in this machine consists in rotating a spur gear-wheel in one direction a number of teeth equal to the number on the key depressed. When the wheel has rotated through a distance of ten teeth, it automatically rotates the wheel in the column above a distance of one tooth. Stops are arranged on the spur-gear at distances apart of ten teeth, and when it is desired to obtain a total the gears are reversed until the stops come to the starting-point, at which place each gear will have rotated a number of teeth equal to the corresponding number in the total.

The spur-gear adding-wheels 132 are arranged to mesh with the rack 101 at the rear end of the rack-bar 100. They are mounted on a shaft 133, which is secured in a frame 134, which frame is mounted on a shaft 135. The frame 134, as will be seen in Fig. 4, is situated between the side plates 1 and is capable of swinging up and down on the shaft 135 a sufficient distance to engage and disengage the adding-wheels 132 from the rack-bar 100.

On the left side of each adding-wheel is a diamond-shaped stop 136, the points of the same being diametrically opposite and are arranged to coincide with the position of two opposite teeth on the adding-wheel, there being twenty teeth in each wheel 132.

The frame 134 has a boss 137 on its left-hand side, and a cam 138 is arranged to operate on said boss 137. The cam 138 is mounted on a shaft 139 and when rotated through a distance of about forty-five degrees the cam 138 depresses the frame 134 through a distance sufficient to cause the teeth of the wheel 132 to engage the rack 101 on the rack-bar 100. (See Figs. 8, 9, 10, and 11, which show the cam 138 in both positions.)

The means for rotating the shaft 139 is a small crank 140, secured to its end just outside of the right-side plate 1. This crank 140 is operated by a connecting-rod 141, secured to the disk 116, and a slot 142 in the connecting-rod 141 surrounds the crank-pin 143. The slot 142 is of such a length that the handle 109 may be drawn almost to the limit of its forward position before the connecting-rod 141 rotates the crank 140. This movement of the crank 140 on the forward movement of the handle 109 causes the cam 138 to depress the frame 134, as shown in Figs. 9 and 10, and this movement takes place after the crank 124 has reached its rearward position. From which it will be seen that the rack-bar 100 is first permitted to move rearwardly before the adding-wheel 132 is brought into engagement therewith. On the return stroke of the handle 109 the slot 142 in the connecting-rod 141 slides over the crank-pin 143 until the handle has almost reached its normal position, when the rear end of the slot 142 will swing the crank 140 to its normal position, which will permit the adding-wheel 132 to rise out of engagement with the rack-bar 100, a spring 144 (see Fig. 6) serving to keep the frame 134 in its raised position. The cam 122 is so designed that the rod 127 will bring the rack-bars 100 to their normal position before the adding-wheels 132 are raised out of engagement therewith.

From the foregoing it is evident that if a key of the calculator—for instance, key numbered "5"—be depressed and the handle 109 drawn forward the rack-bar 100 will move rearwardly a distance of five teeth. The adding-wheel 132 will then be depressed into engagement with the rack 101, which will then be restored to its normal position and rotate the adding-wheel 132 through a distance of five teeth, after which the adding-wheel 132 will be raised out of engagement with the rack-bar 100. This action may be repeated any number of times, and the adding-wheel 132 will continue to revolve each time a number of teeth corresponding to the number on the key depressed.

*The carrying device.*—When the adding-wheels 132 are in their upper position, they are in engagement with the pivoted racks 145, which swing on a shaft 146, situated below the rack-bars 100. These pivoted racks 145 serve the double purpose of holding the adding-wheels 132 in a fixed position and also of rotating them through a distance of one tooth when carrying is to be performed. The distance between the teeth of the rack 145 and the teeth of rack-bar 100 is such that the adding-wheel 132 is never entirely out of gear with both racks. On the side of each rack 145 is an irregular piece 147, having three pins secured thereto. The upper pin 148 serves as a catch for the hook 149, which is pivoted on a shaft 150, mounted in the frame 134. This hook 149 has a small point 151 projecting from its lower side and which comes in the path of the points of the diamond-shaped stop 136, secured on the side of the adding-wheel 132, and when said adding-wheel 132 rotates in a backward direction the points of the stop 136 strike the forward side of the point 151, which is beveled, and in so doing raise the hook 149 until it is disengaged from the pin 148. If the adding-wheel 132 is rotated in a forward direction, the points of the stop 136 strike against the point 151 and stop there, the rear side of point 151 being vertical. When the rack 145 is in its normal position, (see Figs. 6 and 8,) its forward edge is in contact with shaft 139, and the hook 149 holds piece 147 in engagement with pin 152 in the rack 145. When the hook 149 is disengaged from the pin 148, the piece 147 is moved into contact with the pin 153, as shown in Fig. 10. This prevents the hook 149 from immediately reëngaging pin 148, and the piece 147 is moved by the action of the spring 154, which extends between suitable fastenings in the rack 145 and the piece 147.

The adding-wheel 132 for the unit column or column of keys at the extreme right-hand side of the machine has no rack 145 above it; but a stationary pin (not shown) secured in the side frame 1 serves to prevent the same from revolving when out of engagement with the rack-bar 100. A hook 149 is arranged to be acted upon by the stop 136, secured to the unit-column wheel 132, and is bent to the left to engage the pin 148 on the piece 147, secured to the rack 145, for the wheel next to the left, and each of the hooks 149 is so arranged that the point 151 is acted upon by the stop 136 of a right-hand wheel 132, while the point of the hook 149 engages the pin 148 on the parts that act on the next wheel 132 to the left. Secured to the shaft 135, just within the sides of the frame 134, are two vertical cranks 155, across the top of which is secured a horizontal bar 156. This horizontal bar 156 assumes during the process of adding three different positions, as shown in Figs. 8, 9, 10, and 11. Fig. 8 shows it in its normal position, when the handle 109 is at rest. Its two other positions are indicated in the same figure in dotted lines. Fig. 9 shows the position when the handle 109 has reached its forward extreme position. Fig. 10 shows its position while the rack-bars 100 are being restored to their normal position and turning the adding-wheels 132. Fig. 11 shows the bar 156 again returned to its normal position. These movements of the bar 156 are brought about by the action of a cam 157 on the disk 116, which cam acts upon a pin 158 at the end of a bar 159, which is connected to a crank 160 at the end of the shaft 135. The lower end of the crank 160 engages a notched spring-bar 161, which maintains the crank 160 in its two stationary positions.

The operation of carrying is performed as follows: Assume that the adding-wheel 134 has been rotated through a distance of nine teeth and that the machine is at rest, at which place the position of the parts would be shown in Fig. 8. We will now add one by depressing the key numbered "1." When the handle 109 is drawn forward, the rack-bar 100 will move one tooth to the rear, which is shown in Fig. 8. At the end of the forward stroke of the handle 109 the adding-wheel 132 would be lowered into engagement with the rack 101 and the bar 156 would be moved into the position shown in Fig. 9, the cam 157 having pushed the pin 158 to its extreme rearward position and the crank 160 having traversed somewhat beyond the bottom of the second notch in the spring-arm 161. At the beginning of the return stroke of handle 109 cam 157 draws the crank 160 forward until it is in engagement with the second notch on the spring-arm 161 and the bar 156 assumes the position in Fig. 10. The stop 136 will pass the point 151 and disengage the hook 149 from the pin 148. The piece 147 will now spring back until its upper end strikes the bar 156, the small spring 154 keeping the rack 145 in its normal position, the spring 162 moving the piece 147 backward. When the handle 109 nears the end of its return stroke, the cam 138 is turned, and the adding-wheel 132 is brought into engagement with the rack 145, which is still in contact at its forward end with the shaft 139. Just before the completion of the return stroke of the handle 109 the cam 157 draws the crank 160 into the first notch of the spring-arm 161, this after the adding-wheel 132 has resumed its normal position. The movement of the crank 160 in a forward direction causes the bar 156 to move backward to the position shown in Fig. 11, which permits spring 162 to draw the piece 147 and with it the rack 145 backward a distance of one tooth of the adding-wheel 132 and rotate the same the required tooth. The bar 156 remains in the position shown in Figs. 8 and 11 until the next operation of the handle 109, when the wheel 132 is again lowered, and when so lowered the bar 156 moves forward to the position shown in Fig. 9 and reëngages the pin 148 with the hook 149, which movement is performed prior to the time when the rack-bars 100 begin their forward movement for rotating the wheel 132. The return stroke of the handle 109 must necessarily release the key-stems 91 from their lowered position before a new operation of adding can be performed. This is accomplished in the following manner: The rod 107 (see Fig. 6) is supported at the end of two cranks 193, which are secured to a shaft 194. This shaft extends through the left-hand side plate 1 and terminates in a lever 195. (See Fig. 12.) A crank 196 extends from the main shaft 110 and has pivoted to its outer end a slotted hook 197, which slides over a pin 198 at the end of a pivoted lever 199. When the handle 109 is drawn forward, the crank 196 also moves forward, and the hook 197 slides over the pin 198 and engages the lever 195 and is held in engagement therewith by the spring 200. On the return stroke of the handle 109 the hook 197 swings the small lever 195 rearwardly and would continue to do so indefinitely did not an offset 201 in the slot of the hook 197 meet the pin 198 and raise the hook 197 out of engagement with the lever 195. The rearward movement of the lever 195 rotates the rod 194 and swings the rod 107 down on the extensions 108 of the latch-plate 97 and swings said latch-plate 97 out of engagement with the wedge-shaped lug 96 on the key-stems 91, permitting key-stems 91 to resume their normal position.

*The repeating-key.*—If for any reason it is desired to print or add a particular figure a number of times, it is only necessary to prevent the hook 197 from engaging the point 194, and thereby releasing the depressed key-stems 91. To provide for this, the pin 198 is mounted upon a lever 199, which terminates in a key marked "R" in Fig. 2, to the left of the numbered keys of the calculator. The depression of this key R raises the pin 198, so that the hook 197 will travel above the point 195 and not engage the same.

*The calculator recording device.*—The three-pointed piece 128 (see Fig. 6) has one arm extending to the rear, which is at right angles to the downward-extending arm which engages the pin 130 on the rack-bar 100. The end of the rearward-extending arm of the piece 128 is pivoted to a connecting-rod 163 of rather an irregular shape, and the upper end connects to the stem of a type-sector 164, which has engraved on its periphery ten type. A "0" is at the top, succeeded by the figures "1" to "9." The stem of the type-sector 164 is pivoted at 165 to an arm 166, which swings on a shaft 167.

By referring to Fig. 6 it will be seen that if the pin 130 in the rack-bar 100 is moved rearward the connecting-rod 163 will be moved upward, which will cause the type-sector 164 to swing upon the pivot 165. The type on the periphery of the type-sector 164 are arranged so that every time the rack-bar 100 moves in a rearward direction a distance of one tooth from the rack 101 it brings a succeeding type on the type-sector 164 into the printing-line. Thus if the key numbered "5" is depressed and the rack-bar 100 moved rearward a distance of five teeth the connecting-rod 163 will be lifted, so as to bring the figure "5" on the type-sector 164 into the printing-line, and any other figure so depressed on the calculator-keys will cause the corresponding figure on the type-sector 164 to be brought on the printing-line.

An adjustable spring 168 engages the arm 166 and tends to swing it in a rearward direction and cause the type-sector 164 to strike the paper in the carriage. The arm 166 is held in its forward position by a trigger 169, which catches over a forward projecting point of the arm 166 and is made somewhat in the form of a bell-crank, being pivoted on the rod 170. This rod 170 does not extend across the machine, but is supported by two vertical plates 171, secured to cross-bars 172, extending across between the side plates 1.

The trigger 169 is held in engagement with the arm 106 by means of a small spring-plunger 173, which presses against the rearward-extending arm of the trigger 169. When it is desired to release the arm 166 and permit the spring 168 to swing the type-sector 164 against the bar, the plunger 173 is rotated until its pressure is exerted upon the vertical arm of the trigger 169. To accomplish this, and inasmuch as there is a separate plunger 173 for each of the nine triggers 169, they are all mounted in a cylindrical box 174, which is pivotally mounted between the vertical plates 171. The pivot-shaft on the right-hand side, however, extends out through the side plate 1 on the right side and terminates in a small lever 175. (See Fig. 7.) A suitable spring (not shown) keeps the plungers 173 in their normal position, as shown in Fig. 6, and they are rotated so as to release the trigger 169 from engagement with the arm 166 by means of the point 176 on the disk 116 striking the point 175 and rotating it in a forward direction. This occurs at the extreme end of the forward stroke of the handle 109.

The mechanism here described would permit all of the nine type-sectors 164 to print each time the handle 109 is drawn forward, and a line of "0's" would be printed to the left of all the figures printed to make up the full nine denominations. To prevent this, a lock 177 is provided and is pivoted between the plates 171. The lower end 178 of the lock 177 has an offset 179, extending slightly forward. A pin 180 on the forward arm of the piece 128 engages the forward side of 178, and at the extreme lower end of 178 there is a small finger 181, overlapping the next piece, 178, to the left. When the rack-bar 100 moves rearward, the pin 180 is swung downward, and through the offset 179 swings the piece 178 forward, which lifts the check 177 out of engagement with the small notch on the forward side of the trigger 169 and permits trigger 169 to be pressed forward and release the frame 166. All arms 178 to the right of the one acted upon by the pin 180 move simultaneously with it, owing to the overlapping fingers 181, thus raising all of the checks 177 to the right of any column in which the rack-bar 100 moves in a rearward direction; but all checks 177 to the left of the one where the pin 180 has raised the check 177 remain in engagement with the trigger 169 and prevent the same from being disengaged with the arms 166. In this manner the "0's" to the left of the figure are prevented from printing.

The arms 166 are restored to their normal position after printing by a rod 182, which is connected at each end to a crank 183, secured to the shaft 167, upon which the arms 166 swing. These cranks 183 are placed just inside the plates 171, and the shaft 167 extends to the right through the right side plate 1 and terminates in a crank 184. A connecting-rod 185 extends between the end of the crank 184 and the disk 116 and is so placed that when the handle 109 is drawn forward the rod 182 will be moved backward a distance sufficient to permit the arms 166 to cause the type-sector 164 to strike the paper. On the return of the handle 109 the crank 184 is moved to its normal position, as shown in Fig. 7, which restores the cross-rod 182 to the position shown in Fig. 6; but inasmuch as a pivot 186, which connects the rod 185 to the disk 116, is placed a little beyond the dead-center of the shaft 110 and the end of the crank 184 the rod 182 descends a little lower than the position shown in Fig. 6 and then rises to its normal position, thus insuring the engagement of the arm 166 with the trigger 169.

*Paper-feed.*—After the type-sectors 164 have made an impression upon the paper it is necessary to rotate the roller 31 through a distance of one tooth of the ratchet-wheel 187. (See Fig. 1.) This is accomplished in the following manner: The shaft 139 has secured to it a small tooth 188, which on the forward movement of the handle 109 skips by the movable point on a pivoted lever 189. On the return stroke of the handle 109 the tooth 188 is returned to its normal position and strikes the lower end of the lever 189 and swings the upper end thereof forward. The upper end of the lever 189 engages the rod 190, which is connected to a crank 191. The end of the crank 191 carries a spring-pawl 192, and when the rod 190 is swung forward the pawl 192 is raised upward, engages the ratchet-wheel 187, and rotates the roller 31 through a space of one tooth on said roll 187.

*The invoicing device.*—It is sometimes desired to write several lines of words, each followed by a figure, all of which figures are to be added to form a total, as in the case of an ordinary bill or invoice. To facilitate this work, the machine is arranged so that the type-written line may be first executed, a tabulating-stop set at the place that will bring the calculated figures in the desired column, and after each line is written and the number printed through means of the handle 109 the carriage is automatically shifted to the right ready to begin a new line of writing. This is accomplished in the following manner: A pin 202 is secured in an arm of the rack 83, as shown in Figs. 12 and 21. This pin 202 is engaged by a spring-hook 203, mounted on a piece 204, which is pivoted to the crank 111.

When the carriage has moved to its extreme left-hand position, the wheel 87 will have made one complete revolution and be in engagement with the teeth at the other end of the rack 83 from that shown in Fig. 12. This, of course, will swing the pin 202 into the position shown by the dotted lines in Fig. 21. When the handle 109 is drawn forward, the piece 204 will move to the rear and the spring-hook 203 will engage the pin 202. The return stroke of the handle 109 will cause the piece 204, through the hook 203, to draw the pin 202 to the position shown in Fig. 12 and in solid lines in Fig. 21. The travel of the piece 204 being slightly longer than the possible travel of the pin 202, the spring-hook 203 is rotated slightly and permits the pin 202 to ride under an offset 205 in the slot 206 of the piece 204. The pin 202 is then ready to travel in a rearward direction without hindrance on the part of the spring-hook 203. Inasmuch as the hook 203 moves rearwardly far enough to engage the pin 202 when the carriage is in its extreme left-hand position, it will necessarily engage said hook 202 in any position nearer than the extreme position on the return stroke of the handle 109. When it is not desired to use this invoicing device or arrangement, a small knob 207, (see Figs. 2 and 12,) which slides in a longitudinal slot 208 in cover 4, is moved to its upper position, as shown in Fig. 12. This moves pin 209 into the path of the upper end of the spring-hook 203, and as the piece 204 moves rearwardly the point of the hook 203 strikes the pin 209 and moves said hook into the position in the dotted lines in Fig. 21. The hook 203 is maintained in this position by the spring 210, which is secured to the piece 204 and to a small pin 211 in hook 203, the pin 211 being either above or below a dead-center, with the pivot of the hook 203 in the two positions shown in Fig. 21. When the hook 203 has taken the position shown in the dotted lines of Fig. 21, it does not engage the pin 202 on the rack 83. Consequently the piece 204 could move back and forth without affecting the position of the rack 83. The pin 212 in the side plate 1 serves to right the hook 203 to its normal position when the handle 109 is in its normal position. When the knob 207 is drawn to its lower position, it swings the pin 209 out of the path of the hook 203. This position of the pin 209 is shown in the dotted lines in Fig. 21, and with pin 209 in this position the hook 203 will always cause the carriage to move to the left-hand marginal stop when the handle 109 is operated.

*The total-key.*—In taking a total the key marked "T," to the left of the calculator-keys, in Fig. 2, is depressed. This key is connected to a bell-crank 213, pivoted to the left side plate 1, and at its upper end connects with the sliding bar 214. The action of this bar 214 causes the adding mechanism to properly engage to produce the total. To do this, the machine must reverse the adding-wheels 132 to the starting-point, and this action of reversing the total-wheels must also so regulate the position of the type-sectors 164 that they will move upward a number of type equal to the number of teeth that each corresponding adding-wheel 132 revolves. This is accomplished in the following manner: The adding-wheels 132 are first depressed into engagement with the rack 101. This is accomplished by a wedge 215 on the end of the bar 214, which depresses the frame 134. (See Figs. 25 and 26.) It is next necessary to disengage the latch-plates 105. This is done by a series of fingers 216, extending from a shaft 217, which is pivoted in the side plates 1. A slotted crank 218 engages a pin 219 on the bar 214, and when said bar 214 is drawn forward the fingers 216 are depressed and in turn depress the latch-plates 105 and disengage them from the hook 104 in the rack-bar 100. This leaves the rack-bar 100 free to move in a rearward direction when the handle 109 is drawn forward, and the rack-bar 100 will move as far to the rear as the revolution of its adding-wheel 132 will permit—that is, until the stop 136 on the adding-wheel 132 strikes the rear side of the point 151. For every tooth that the rack 101 moves to the rear it will raise a figure on the type-sector 164. Thus if the figure in the total be "5" the rack 101 will move to the rear five teeth, and the type-sector 164 will bring the figure "5" to the printing-line.

A lock for the total-key is provided in the following simple manner: A hook 220 (see Fig. 6) is pivoted to the side plate 1, and a small pin 221 is arranged to engage said hook when the bar 214 is drawn forward by the action of the total-key as soon as the handle 109 begins its forward movement. The hook 220 has a downward-projecting stem 222, which is engaged by a pin 223 on the curved piece 224, secured to the main shaft 110. When the handle 109 is in its normal position, the pin 223 strikes the downward projection 222 and lifts the hook 220 out of engagement with the pin 221. A pin 225 near the end of the curved piece 224 comes under the rear point of the hook 220 when the handle 109 is drawn to its extreme forward position and raises the hook 220 out of engagement with the pin 221. From this it will be seen that the hook 220 is held out of engagement at both extreme positions of the handle 109. This prevents the total-key T from springing up and releasing the adding-wheels 132 from engagement with the rack 101 before said rack 101 has reached a stationary position, thereby preventing the type-sectors 164 from printing a false total. If the total-key T is held down during the forward stroke and the return stroke of the handle 109, the adding-wheels 132 will first be reversed to the starting-point, setting the type-sectors 164 for printing the total, after which the total will be printed. Then on the return stroke of the handle 109 the adding-wheels 132 will be rotated in a forward direction the same number of teeth that they were previously reversed. In this way the total is saved in the machine and we may go on adding to the same. If, however, it is desired to clear the machine, the total-key T is depressed and the handle 109 drawn forward. The total is printed as usual; but at the forward end of the stroke of the handle 109 hook 220 is released from the pin 221 and the total-key T rises to its normal position, and the spring 226 (see Fig. 4) draws the bar 214 backward and permits the adding-wheels 132 to rise out of engagement with the rack 101, while the points of the stops 136 are in contact with the point 151 of the hook 149. At this position the adding-wheels 132 are at zero and the machine is clear. To prevent the rack-bars 100 from springing backward the full distance of the slot 103 when the total-key T is released at the forward end of the stroke of the handle 109, a series of ratchet-teeth 227 of the same pitch of the rack 101 are cut in the bottom of the rack-bar 100 and spring-pawls 228 are held out of engagement with said ratchet-teeth 227 by a rod 229, (see Fig. 6,) which rod 229 is raised at the end of the forward stroke of the handle 109, permitting the spring-pawls 228 to engage the ratchet-teeth 227. This rod 229 is operated as follows: It is mounted between two cranks 230, secured to a shaft 231, and the right end of the rod 229 extends through a suitable opening in the right side plate 1 and also through a diagonal slot 232 in the sliding bar 233. (See Fig. 7.) The sliding bar 233 has secured to it two pins 234 and 235, and on the inside of the disk 116 there is a lug 136, so arranged that when the handle 109 is drawn forward the last part of this movement causes the lug 236 to strike the pin 234 and move the bar 233 to the rear. This brings the upper part of the slot 232 in engagement with the end of the rod 229 and raises said rod 229, so that the spring-pawls 228 may engage the ratchet-teeth 227 on the inside of the rack-bar 100. This prevents any further rearward movement on the part of the rack-bars 100.

In order to prevent the cam 138 from engaging the frame 134 at the end of the forward stroke of the handle 109, as usual, the bar 214 has a lateral incline 237 on its rear, (see Figs. 25, 26, and 4,) which when drawn forward strikes the side of the cam 138 and moves the same to the right against the tension of spring 238. The plane of the cam 138 is now to the right of the boss 137 on the frame 134, and its rotation will have no effect, so far as the vertical movement of the wheels 132 is concerned.

I claim—

1. In a machine of the character described, a keyboard having a plurality of rows of keys, a cover above which all of said keys project, the front rows operating a type-writing mechanism, and the back rows operating a calculating mechanism, the calculating mechanism being arranged with a series of keys for each denomination.

2. In a machine of the character described, the keyboard having a plurality of rows of keys, a cover above which all of said keys project, the front rows operating a type-writing mechanism, and the back rows operating a calculating mechanism arranged with a series of keys for each denomination, a paper-roller mounted in a transversely-sliding carriage, a printing mechanism operated by the type-writer keys, a printing mechanism operated by the calculator-keys, both of which print upon the front side of the roller in the transversely-sliding carriage.

3. In a machine of the character described, a plurality of keys for operating a type-writer mechanism, a cover above which all of said keys project, a series of keys placed just back of the aforesaid keys for operating a calculator device arranged with a series of keys for each denomination, a printing device for type-writing, and a printing device for the calculator, both of which printing devices operate to print on the same line.

4. The combination of a series of columns of keys having numbers, a type-sector pivoted at its center for each column of keys, a spring-propelled arm upon which each sector is independently mounted, means to cause the type-sector to swing on its pivot a distance proportional to the number of the key depressed and means for causing the type-sector to strike the printing-surface.

5. In a machine of the kind described, a keyboard having a plurality of rows of keys, a cover above which all of said keys project, the front rows operating a type-writing mechanism, and the back rows operating a calculating mechanism, and being arranged in columns, and numbered from 1 to 9, inclusive, substantially as described.

6. In a machine of the kind described, a keyboard having a plurality of rows of keys, a cover above all of which said keys project, the front rows operating a type-writing mechanism, and the back rows operating a calculating mechanism, and being arranged in columns corresponding to the denominations, and numbered from 1 to 9, a paper-roller mounted in a transversely-sliding carriage, and a printing mechanism operated by the type-writing keys, and a printing mechanism operated by the calculator-keys, both of which print upon the front side of the roller in the transversely-sliding carriage, substantially as described.

7. In a machine of the kind described, a plurality of keys for operating a type-writing mechanism, a series of keys placed just back of the aforesaid keys for operating the calculating device, arranged in columns, and numbered from 1 to 9, a printing device for type-writing and a printing device for the calculator, both of which printing devices operate to print on the same line and a cover above which all of said keys project, substantially as described.

8. In combination a rack and a series of keys, capable of longitudinal movement and having lateral stops thereon, for limiting the travel of the rack, a latch for holding the rack in a retracted position, and projections from the keys which release the said latch when a key is depressed, and a latch for holding the keys in their depressed position, so arranged that the depression of any key serves to release any key previously depressed in said series.

9. The combination of a plurality of rows of keys, a cover above which all of said keys project, a type-writing mechanism operated thereby, a transversely-sliding carriage, a series of rows of keys arranged in columns, and numbered from 1 to 9, for operating a printing calculator mechanism, both the type-writing and calculating mechanism printing on the same printing-line of the carriage, and the type-writer keys arranged in front of the series of calculator-keys.

10. The combination of racks having variable travel, adding-wheels, a carry-arm 145 to engage the adding-wheels, a movable latch-piece 147 having a limited movement on the carry-arm, a hook 149 holding the carrying-arm in its normal position, means for holding the arm 145 in its forward position after the hook 149 has been released, and a spring for moving the carry-arm 145 to its backward position.

11. The combination of racks having variable travel, adding-wheels, carry-arms 145 arranged to engage the adding-wheels at all times when the same is not in engagement with the racks, movable latch-pieces 147 having a limited movement on the carry-arms 145, a hook 149 for holding the carry-arm in its normal position and the bar 156 arranged to swing the latch-piece 147 forward until the hook 149 is engaged while the adding-wheels are out of engagement with the carry-arm.

12. The combination of racks having variable travel, adding-wheels, carry-arms 145, movable latch-pieces 147, having a limited movement on the carry-arm 145; the hook 149 and the bar 156 arranged to swing the latch-piece 147 forward until the hook 149 is engaged, while the adding-wheels are out of engagement with the carry-arm 145, and to move backward to permit the carry-arm to rotate the adding-wheel a distance of one tooth after the adding-wheel has engaged the carry-arm 145.

13. The combination in an adding-machine of racks with variable travel, adding-wheels that engage and disengage with said racks, carry-arms that engage the adding-wheels when the same are not engaged with the racks, means for holding the carry-arms in a forward position, and a movable bar 156 which forms a back-stop for the carry-arms, and is held in a forward position when the adding-wheels are in engagement with the racks, and moves backward after the wheels have engaged the carry-arms a distance permitting the carry-arms to revolve the adding-wheels one tooth.

14. The combination in an adding-machine of racks with variable travel, adding-wheels mounted in a movable frame, automatically-operated cams for engaging the adding-wheels with the racks when adding, a key-operated means for engaging the adding-wheels when taking the total, which means displace the automatically-operated cams from their operative position, substantially as described.

15. The combination in a calculating-machine of a handle for operating the machine, adding-wheels mounted in movable frame, racks with variable travel, cams operated by said handle for bringing the racks and adding-wheels into engagement, and a total-key which will displace the said cams from their operative position, and at the same time engage the adding-wheels with the racks, substantially as described.

16. The combination in a calculating-machine, of handle operating shaft 110, crank 116, connecting-rod 141, having a lost-motion device 142, provided therein, a shaft 139, bearing cams 138, and provided with a crank 140, and means for displacing the cams 138, so that the action of the connecting-rod 141 will not bring them into their operative position.

17. The combination in a calculating-machine of horizontal sliding racks, having variable travel, vertically-moved type-sectors, mounted on spring-propelled pivoted arms, means for communicating a relative motion from the rack to the type-sector, and carriage holding paper to be printed on, a means for releasing said pivoted arms when it is desired to print, substantially as described.

18. The combination of a spring-propelled type-sector, a rack having variable travel, a shaft 125, upon which is mounted the crank 128 having a plurality of arms, one arm being connected to the rack and one arm connected to operate the spring-propelled type-sector.

19. The combination in an adding-machine of a printing device, a shaft 125, crank-levers 128, mounted thereon, having two or more arms, one arm of each lever made perpendicular to said shaft 125, and connected to the operative parts of the adding-machine, another arm of each lever made inclined toward said shaft 125, so that the ends of said arms approach each other, and are connected at said ends to means for operating the printing device, substantially as described.

20. The combination of racks 100, a shaft 125 connected therewith, bell-crank levers 128 mounted on said shaft, arms 166, type-sectors 164 mounted on said arms, rods 163 connecting the bell-crank levers and type-sectors and means for releasing the arms 166 when it is desired to print, substantially as described.

21. The combination of racks 100, crank 128 having a plurality of arms, mounted on shaft 125, pin 180, on the forward arm of crank 128, checks 177, arranged to be released by the depression of the pins 180 and also by the release of any check to the left, substantially as described.

22. The combination in an adding-machine of a series of key-stems capable of longitudinal movement only and having lateral stops thereon, for limiting the travel of the racks, racks provided with a series of steps for engaging the aforesaid stops when the keys are depressed, latches 99 for holding the key-stems in their depressed position, so arranged that when any key in the series is depressed it will release any previously-depressed key-stem in that series.

23. The combination of an adding-machine, of racks 100, having steps thereon, key-stems capable of longitudinal movement only and having laterally-projecting stops 99, latches 97 for holding the key-stems in their depressed position, so arranged that the depression of any key-stem will release any previously-depressed key-stem in a given series, and means for releasing all said latches 97 when desired.

24. The combination of racks 100, key-stems, laterally-projecting stops 99 on said stems, the racks 100 limited in their travel by said stops, latches 97 for holding the key-stems in their depressed position, and catch-plates 105 for holding the racks in their forward position, and lateral projections on the key-stems for disengaging the catch-plates 105, substantially as described.

25. In a machine of the kind described, a keyboard having a series of rows of keys, a type-writing mechanism and calculator mechanism having stops, the front rows of keys for operating the type-writing mechanism, the back rows for operating the stops of a calculating mechanism, and arranged in columns numbered from 1 to 9, and means for operating the calculating mechanism after the keys therefor have been depressed, substantially as described.

26. In a machine of the kind described, a type-writing mechanism and a calculator mechanism having stops, a keyboard having a series of rows of keys, the front rows operating the type-writing mechanism, and the back rows arranged in columns, numbered from 1 to 9, for operating the stops of the calculating mechanism, and means for operating said calculating mechanism after the keys therefor have been depressed, a paper-roller mounted in transversely-sliding carriage, and a printing mechanism operated by the type-writer keys, and a printing mechanism operated by the calculator-keys, both of which print on the front side of the roller in the transversely-sliding carriage, substantially as described.

27. The combination of calculator-keys having stops upon their stems, a sliding rack-bar for operating the adding device, and an adding device consisting of wheels, and a carrying mechanism, and a type-sector which is rotated to bring a type to the printing-line, corresponding to the figure on the calculator-key depressed, and a spring-arm supporting said type-sector, which impinges the same upon the surface to be printed upon, after the proper type has been brought to the printing-line, substantially as described.

HALCOLM ELLIS.

Attest:
L. E. RICKMAN,
EDWIN S. CLARKSON.